United States Patent
Sahlgren et al.

[11] Patent Number: 6,023,325
[45] Date of Patent: Feb. 8, 2000

[54] ARRANGEMENT FOR SENSING ELASTIC DEFORMATION IN A TOOL STEM IN A MACHINE TOOL

[75] Inventors: Bengt Sahlgren, Saltsjö-Boo; Raoul Stubbe, Stocksund; Claes Ericsson, Vallentuna, all of Sweden

[73] Assignee: Reflex Instrument AB, Vallentuna, Sweden

[21] Appl. No.: 09/066,414

[22] PCT Filed: Oct. 23, 1996

[86] PCT No.: PCT/SE96/01363

§ 371 Date: May 4, 1998

§ 102(e) Date: May 4, 1998

[87] PCT Pub. No.: WO97/16282

PCT Pub. Date: May 9, 1997

[30] Foreign Application Priority Data

Nov. 2, 1995 [SE] Sweden .................................. 9503873

[51] Int. Cl.[7] .................................................. G01N 21/88
[52] U.S. Cl. ............................................ 356/73.1; 356/43
[58] Field of Search ............................... 356/73.1, 239.2, 356/43, 44; 138/120

[56] References Cited

U.S. PATENT DOCUMENTS

| | | | |
|---|---|---|---|
| 4,151,747 | 5/1979 | Gottlieb et al. | 73/356 |
| 4,295,739 | 10/1981 | Meltz et al. | 356/43 |
| 4,745,908 | 5/1988 | Wardle | 128/6 |

FOREIGN PATENT DOCUMENTS

| | | |
|---|---|---|
| 0 183 663 | 6/1986 | European Pat. Off. |
| 41 07 676 | 9/1992 | Germany . |
| 172 677 | 5/1993 | Norway . |

*Primary Examiner*—Frank G. Font
*Assistant Examiner*—Tu T. Nguyen
*Attorney, Agent, or Firm*—Jacobson, Price, Holman & Stern, PLLC

[57] ABSTRACT

There is shown an arrangement for detecting elastic deformation of a tool shaft carried by a machine tool and, in turn, carrying a cutting bit. An optical fibre section is mounted in or on the shaft at a distance from its neutral bending line in the longitudinal direction of said shaft. The optical fibre section, which follows the elastic deformation of the shaft, extends parallel with and at a constant distance fro the neutral bending axis of said shaft, so that elongation of the fibre section forms a measurement of bending of the shaft in an axial plane that includes the optical fibre section. The optical fibre section has at least two longitudinally spaced partial reflection means and means are connected to the optical fibre section to determine interferometrically a change in distance between the partial reflection means in the optical fibre section, wherein the change in distance forms a measurement of shaft curvature between the two partial reflection means. The arrangement also includes means for compensating for the influence of temperature on the change in distance between the partial reflection means.

24 Claims, 4 Drawing Sheets

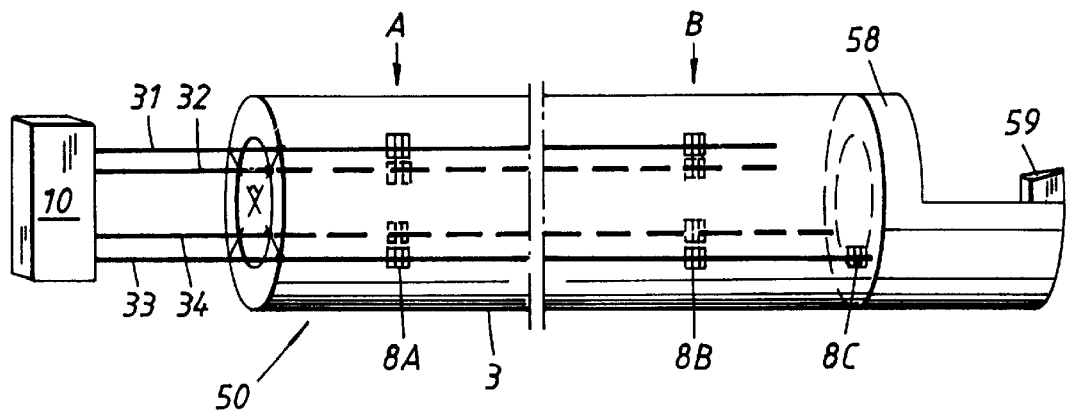
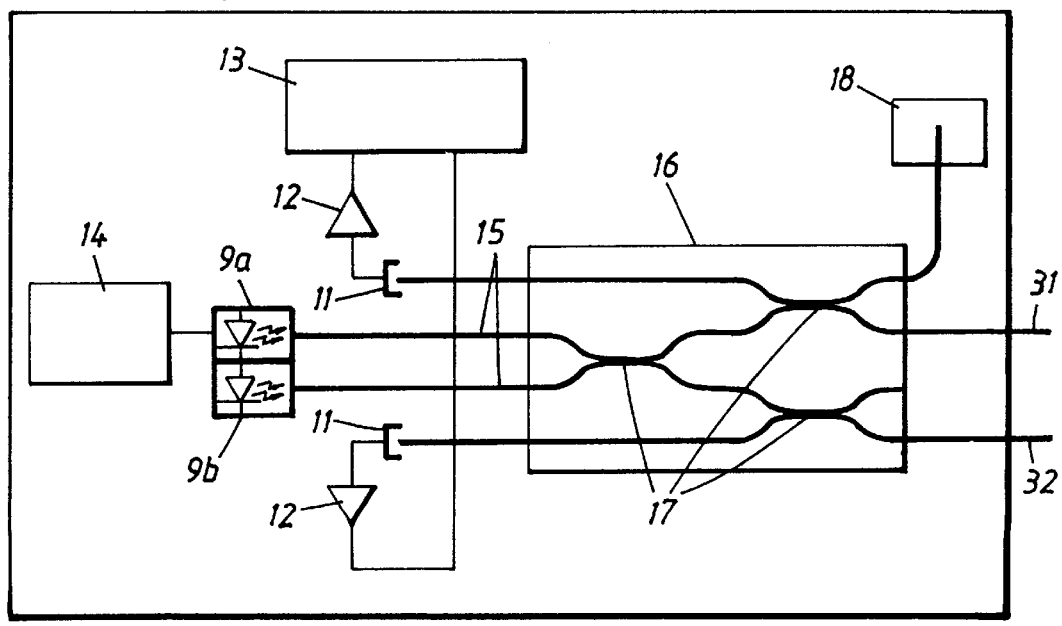

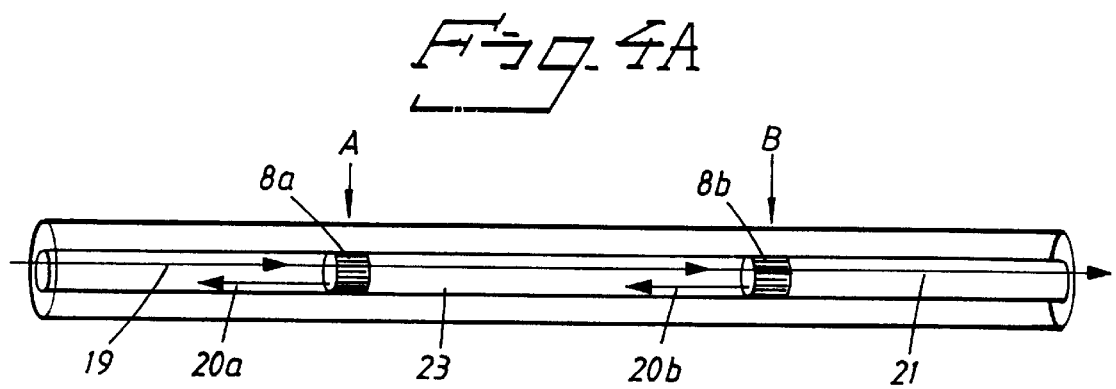
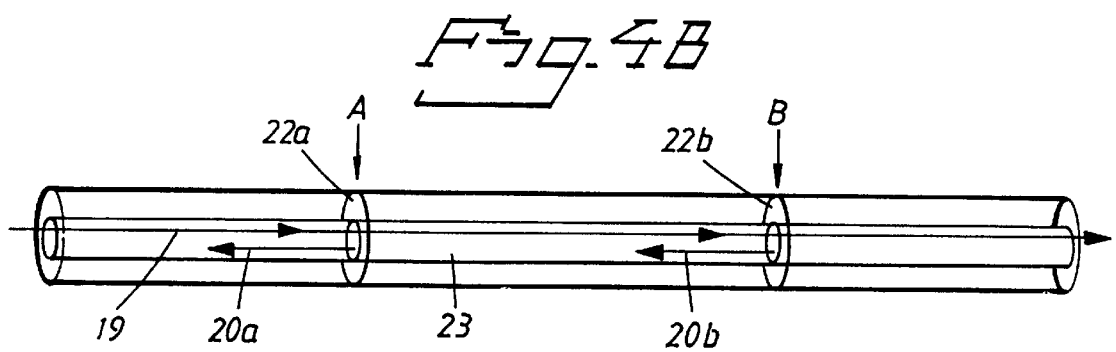
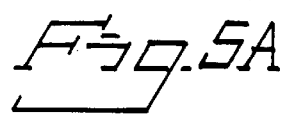  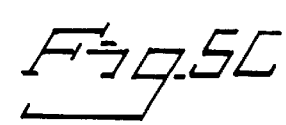
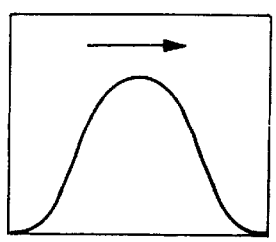 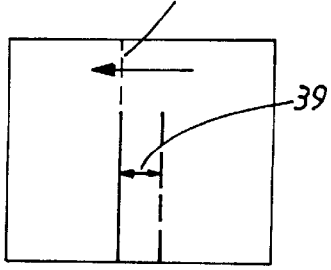 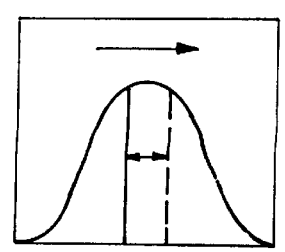

ARRANGEMENT FOR SENSING ELASTIC DEFORMATION IN A TOOL STEM IN A MACHINE TOOL

BACKGROUND OF THE INVENTION

In the case of lathe bars and like tool holder rods used in machine tools, vibrations and bending will occur as the machine tool is at work. These vibrations and deflections of the tool holder rods can be particularly troublesome, especially when the rods have long lengths.

One problem in this regard resides in the vibrations, and particularly sympathetic (resonance) vibrations that occur in the system, particularly between the driving end of the tool holder shaft and a cutting bit carried by the tool holder. For instance, the power alternating effect between workpiece and cutting bit can induce bending, twisting and/or axial compression of the tool holder shaft. The shaft can also be induced into some form of vibratory state, causing the bit to vibrate and thereby generate a corresponding surface state of the workpiece.

NO-C-172 677, for instance, teaches a method of minimizing vibrations with the aid of a vibration damping device on a tool holder rod.

SUMMARY OF THE INVENTION

The object of the present invention is to provide a tool holder rod that is provided with sensing or detecting devices that are effective in sensing or detecting at least bending of the tool holder rod and preferably also twisting of the rod and/or changes in axial lengths thereof, so as to enable the actual position of the cutting bit relative to the known attachment position of the tool holder rod to be detected when the tool is at work, so that the machine tool parameters can be adjusted such that the bit will take the intended position and produce the desired working surface on the workpieces irrespective of whether or not the tool holder rod is twisted and/or bent or increases in length as the machine tool is at work.

Another object of the invention is to detect time-wise variations in bending, twisting and/or length changes of the tool holder shaft, so as to enable the operating parameters to be changed in a manner to keep bit vibrations within acceptable and chosen limits. This enables the skilled person to vary the operating parameters in a manner to avoid the resonance phenomenon.

Another object of the invention is to provide means for sensing the bit temperature when the machine tool is at work, so as to obtain an indication of the state of the cutting bit and therewith enable a cutting bit to be changed before a breakdown occurs; the beginning of a breakdown can often be forecast as a result of a specific temperature development.

In accordance with the invention, bending and bending variations of the tool holder shaft are measured with the aid of an optical fibre section mounted in or on the shaft at a distance from its neutral bending line, preferably close to the outer surface of the shaft. The optical fibre section is mounted in the longitudinal direction of the shaft. As the shaft bends, the optical fibre section will therefore be subjected to a change in length representative of the bend in an axial plane that is placed under tension by the optical fibre section and the shaft axis. By shaft ais is meant the shaft neutral bending line, i.e. the centres of gravity of the cross-sectional areas of the shaft. It is then possible to evaluate bending of the shaft, by calculating the physical change in distance between two partial reflection means (e.g. grids) which are mutually spaced the optical fibre section, wherein, in accordance with the invention, an optical measurement is made such that the measuring result will be primarily comprised of the optical change in distance between said partial reflection means. It is important to note in this regard that this optical change in distance does not only correspond to the change in physical distance, but is also influenced by the effect of the physical elongation on the optical properties of the fibre, such as its refractive index. Because the optical fibre section has mutually spaced partial reflection means, it is possible to detect interferometrically changes in length of the optical fibre section between the reflection means as a result of bending in the axial plane through the shaft where the section concerned lies. In the case of the present invention, bending of the tool holder shaft results in changes in the core of the optical fibre used, these changes resulting, in turn, in a measurable change in the "electromagnetic signature". This results in a strong alternating effect between measuring magnitudes, i.e. between bending and the light in the fibre. In turn, this provides conditions which enable measurements to be made to a high degree of accuracy and enables useful measurement data to be obtained even in the case of tool holder shafts of relatively small diameters. The use of two fibre sections in different axial planes of the shaft enables bending of the shaft to be calculated in these different axial planes, and thus also shaft vibrations in said planes. The two axial planes may conveniently be spaced apart through an angle of 90°, for instance. However, in the case of large elongations/bends, the shaft is also influenced by shear stresses. Consequently, it may be convenient to arrange three optical fibre sections (with associated pairs of partial reflection means) in different axial planes of the tool holder shaft, for instance preferably in equidistantly spaced axial planes.

However, it will be evident that the "partial reflection means" may comprise at least two parts of, e.g., two grid lines in some form of grid structure. This grid structure will then have an "electromagnetic signature", i.e. will respond with a certain electromagnetic signature when light is conducted to the grid structure through the optical fibre section. This electromagnetic signature may, for instance, be comprised of a centre wavelength of the grid structure, this centre wavelength naturally being changed when the grid structure is subjected to linear strain causing the distance between the grid structure lines to change. This change is detected and elastic deformation of the shaft at the grid structure can then be evaluated or calculated on the basis of the signature change and on the basis of the knowledge of the grid structure position and direction relative to the shaft neutral line, the changes in the refractive index due to elongation of the fibre section, and so on. It will be understood, however, that the inventive embodiments at present preferred are based on constructions in which an optical fibre section has at least two longitudinally spaced grid structures, wherein the change in distance between said grid structures is determined instead of determining the change in signature of one of these grid structures as a result of bending of the fibre.

It may also be convenient and even beneficial to provide an optical fibre section that extends helically and which is coaxial with the neutral bending line of the tool holder shaft and located at a constant distance therefrom, so as to enable twisting of the tool holder shaft to be measured.

If so desired, two such helical optical fibre sections and associated partial reflection means can be provided, with the pitch of the helices having mutually different directions.

One of the optical fibre sections can be passed to the region in which the tool holder shaft carries the cutting bit or is provided with said bit. The optical fibre section may have in this region a grid structure which enables the temperature to be sensed with optical fibre optical means. For instance, the optical fibre may be provided with a grid formation in which the distance between the grid lines changes in response to changes in temperature of the fibres, so as to change the grid reflex wavelength. Other interferometric methods can be used for temperature measuring purposes.

The inventive arrangement includes means which compensate for the influence of temperature on the change in distance between the partial reflection means in each optical fibre section that is adapted to sense a change in distance between the partial reflection means generated by elongation.

According to one embodiment of the invention, the means which compensates for the influence of temperature is achieved by virtue of the optical fibre section concerned having an associated optical fibre section which lies parallel with itself in the same axial plane and the helical plane respectively, wherein the associated fibre section also has partial reflection means which lie preferably in the same positions along the probe as the positions of the partial reflection means in said measuring optical fibre section, whereby the difference in elongation between the two optical fibre sections affords a temperature-independent measuring value of the elongation of the optical fibre section and thus a measurement of the bending of the tool holder shaft, twisting of said shaft or a change in length thereof.

The inventive arrangement is thus able to determine the twisting and bending state of the tool holder shaft to a high degree of accuracy, so as to enable the position of the cutting bit carried by the tool holder shaft to. be accurately calculated as the machine tool is at work. The position of the cutting bit and the longitudinal rotational/bending state of the tool holder shaft can also be monitored in time, so as to enable vibrations in the cutting bit and in the shaft to be detected and counteracted prior to causing damage to the workpiece.

It will be evident that the tool holder shaft can be provided advantageously with damping means for reducing the risk of resonance phenomenon with regard to vibrations in the shaft as the machine tool is at work.

The damping means may be configured conveniently to allow coolant/cutting fluid to be conducted to the machining location/the cutting bit.

Because the inventive can be conveniently mounted onto a tubular tool holder shaft, coolant can thus be passed through the hollow shaft and up to the cutting bit.

The person skilled in this art that will understand that the invention is not restricted to any particular type of cutting bit; the cutting bit can thus have the form of an exchangeable or indexable bit or a ground cutting edge on one end of a tool.

The invention enables the various vibratory modes of the tool holder shaft/the drill rod to be monitored, both with respect to type and magnitude, so as to enable the operating parameters to be changed to avoid undesirable vibration modes or undesirably large vibrational amplitudes, while, at the same time, maintaining machining of the workpiece at an optimally high level in accordance with principles and parameter modification patterns that can be employed on the basis of experience values or which are already well known to the person skilled in this art.

It lies within the scope of the invention to register a number of different vibrational patterns and to identify these patterns and to refer to alternative operational parameter settings with which undesirable vibrational patterns are avoided or minimized while essentially maintaining machining performance.

The inventive arrangement provides high measuring accuracy even when applied to a relatively narrow or slender tool holder shaft/drill rod, and the sensor part of the arrangement, i.e. the equipment for evaluating those signals that are obtained from the optical fibre sections, to be included as a permanent installation in the tool holder shaft at reasonable cost and with a sufficiently long useful life.

A further advantage afforded by the aforesaid use of a sensor part that includes an optical fibre having reflection means in the tool holder shaft is that a long row of sensor elements (each including an optical fibre section having, e.g. two mutually spaced partial reflection means/grids) can be multiplexed on one single fibre. This enables the construction of a sensor that is able to measure shaft curvature at a large number of positions along a long length. The bending pattern of the shaft can be determined rapidly, when different grids are used for the different sensor elements. Multiplexing can be effected, e.g., by propagation path/time difference through the medium of incoming light and grid reflected light which is equal but located at different positions along the optical fibre. Alternatively, multiplexing can be based on different reflection wavelengths for grids of different frequencies. A further advantage afforded by the use of optical fibre sections having mutually spaced reflection means as mirrors in an interferometer is that it is possible to define a measuring path along which the mean bending value is obtained. This avoids the problem caused by local inhomogeneties.

Fibre grids also have the advantage that they can be mass-produced. This enables grids to be fabricated in an optical fibre (written into the fibre) at a large number of points therealong, the length of said fibre possibly being in the kilometre range, at relatively low extra cost.

The person skilled in this art will realise that a basic design of the inventive arrangement will be able to function with partial reflection means, e.g. grids, in two positions spaced axially along the tool holder shaft. It will also be evident from the aforegoing that the probe can be provided with grid/reflection means in a plurality or a multiple of mutually spaced axial positions along the bend detecting optical fibres, so as to enable bending of the shaft and possible axial rotation or twisting thereof to be measured in many different axial sections along the shaft.

The invention is particularly suited for use with relatively long lathe bars for machining surfaces of a workpiece, since it is often not possible to support these lathe bars between the attachment end and the cutting bit. However, the invention is not restricted to such lathe bar but finds general use in tool stems, for instance drill stems, and general tool holder shafts which are subjected to dynamic, elastic deformations (vibrations) in operation and/or are subjected in operation to more static elastic deformations caused by the intrinsic weight of the shaft and the cutting forces.

BRIEF DESCRIPTION OF THE DRAWINGS

The invention will now be described with reference to exemplifying embodiments thereof and also with reference to the accompanying drawings.

FIG. 1 illustrates schematically a lathe bar provided with an inventive arrangement.

FIG. 2 is a schematic illustration of a control unit belonging to the inventive arrangement.

FIGS. 4a and 4b illustrate respective examples of sensor elements formed by optical fibres that have mutually spaced partial reflection means.

FIGS. 5a–5c illustrate respectively intensity as a function of the wavelength of incident light, reflected light and transmitted light at a grid-type partial reflection means.

DETAILED DESCRIPTION OF THE PREFERRED EMBODIMENT

In the illustrated embodiment, the lathe bar 3 is comprised of a flexible, circular cylindrical rod in the form of a thick-wall tube whose inner and outer diameters are known. Optical fibres 31–34 are fastened to the cylindrical lathe bar 3, e.g. moulded therein or glued thereon. The fibres are mounted on/in the body 3 so as to follow deformations in said body. The fibres 31–34 therewith extend parallel with the neutral bending line of the lathe bar, wherein each of the fibres is spaced at a constant distance along its length from the axis of the lathe bar (a neutral line with respect to bending) along its measuring length.

Figure 3A:
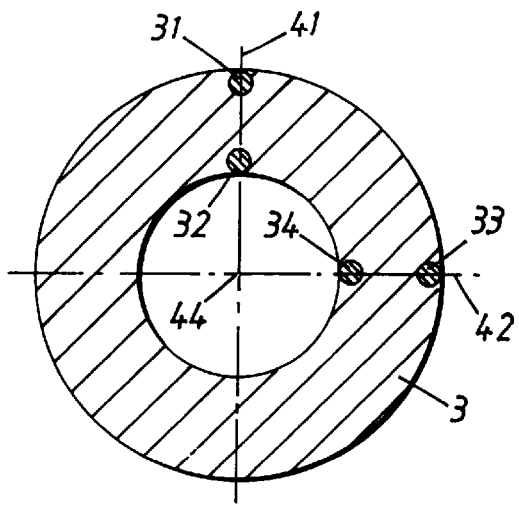
FIGS. 3a–3d are cross-sectional views of the inventive lathe bar with optical fibres mounted in four different conical configurations.

Referring to FIG. 3a, which can be considered as being a cross-sectional view of the tubular lathe bar 3 shown in FIG. 1, it will be seen that the fibres 31 and 32 lie on the outer surface and inner surface respectively of the lathe bar 3 in an axial plane 41 to said lathe bar 3 through its neutral axis 44 with respect to bending. Correspondingly, the fibres 33 and 34 lie in an axial plane 42 to the lathe bar 3, wherein the planes 41, 42 are shown to be separated, preferably through an angle of 90°. In the configuration shown in FIG. 3a, the fibres lie in respective axial planes on one and the same side of the axis 44.

Referring back to FIG. 1, it will be seen that the fibres 31–34 are connected to a signal unit 10.

Each of the optical fibres include a partial reflection means 8a, 8b, 22a, 22b at two predetermined positions A and B along the body 3.

As will be seen from FIG. 4a, each of the partial reflection means of the illustrated embodiment is comprised of a respective fibre grid 8a and 8b. Incident light 19 is reflected partially by the grid 8a and gives rise to an oppositely directed beam 20a. Correspondingly, the other grid 8b gives rise to an oppositely directed beam 20b, while part of the light is transmitted as indicated at 21.

In the case of an alternative embodiment shown in FIG. 4b, partially reflecting mirrors 22a and 22b are incorporated in the fibres at respective positions A and B, for instance. The mirrors are incorporated by cutting the optical fibre and applying a layer of $TiO_2$ for instance by vapour deposition and thereafter welding the mutually proximal ends of the fibre together such that the vapour-deposited layer establishes a partially reflecting mirror.

It will be seen from FIG. 2 that light emanating from light sources 9a, 9b is conducted by optical fibres 15 to an optical chip 16, where the light is distributed to the sensor fibres 31, 32 through the medium of a number of waveguide switches 17. Subsequent to being reflected in the grid elements 8a, 8b, the light 19 returns as signals 20a, 20b (see FIG. 4) and is again distributed by the chip 16 to the detectors 11 and then amplified in respective amplifier stages 12. The resultant signal is then processed electronically in the processor 13. The light sources 9a, 9b are operated with control electronic means 14 which with the aid of a reference grid 18, among other things, ensures that the wavelength of the laser light source is kept constant. It will be understood that a unit 10 according to FIG. 2 can be used for each pair of detector fibres 31, 32; 33, 34; 35, 36; 61, 62.

The fibre grids 8a, 8b have a broad spectral characteristic in relation to the light source 9. When the wavelength of the light source 9 is chosen to be close to the central wavelength of the grids 8a, 8b, the grid pair 8a, 8b will function as a pair of mirrors in the fibre. When the grids have a relatively low reflectance so that multiple reflections can be ignored, the two reflection means, the grids 8a, and the fibre will form a so-called Fizeau interferometer. The phase position between the two reflected beams 20a, 20b is linearly dependent on the distance between the grids 8a, 8b and therewith linearly dependent on the elongation of the optical fibre. The phase difference thus reflects bending of the probe body 3 between the grid pair. The two reflected beams 20a, 20b are thus passed back to the detector 10, where they are permitted to interfere. The coherence length of the light source will preferably be greater than twice the distance between the grids 8a, 8b. The processor 13 provides a bending measurement value. The detected signal is sinusoidally dependent on the phase difference (interference fringes) and the signal processing is intended generally to count and keep check on the fringe position or state. One important advantage afforded by the interferometric measuring technique is that it is sufficiently responsive to measure very small bends, or in other words bends of large curvature radii.

However, one drawback is the periodic dependency of the signal on bending of the body 3. This means that the measuring method cannot basically provide an absolute value, but only a relative measurement value. However, there are several ways of overcoming this weakness. One method is to use two wavelength interferometry. As the term implies, there are required in this case two wavelengths which can be obtained either by using two mutually independent light sources 9a, 9b (c.f. FIG. 2) or by using a light source which can be tuned with respect to wavelength so as to achieve a corresponding function.

By measuring the fringe state at both wavelengths, it is possible to quasi determine absolutely on which fringe in the order the interferometer is located, over a sufficiently wide measuring area. This method can be used to ascertain the direction in which the fringes move. Another way is to use one of the grids 8a, 8b included in the Fizeau interferometer, and particularly the spectral characteristic of the grid. For instance, it is possible to establish the centre wavelength of the grid, by using a tunable light source, or by using spectroscopic, i.e. wavelength-dependent, detection. The centre wavelength is also dependent on elongation, and measuring of the centre wavelength enables an absolute value of fibre bending to be established. However, this method is not as accurate as the interferometric method, although it can be used to provide an approximate start value. However, the method can be used to advantage in combination with two wavelength interferometry, to obtain a highly accurate measurement of the absolute value of fibre elongation.

The use of two mutually parallel and mutually spaced optical fibre sections 31, 32 in one axial plane 41, with reflection means spaced equally along the probe, has the advantage that any temperature change will have an equal influence on the two fibres 31, 32, whereas bending of the body 3 will result in different elongations of the fibres 31, 32. Thus, subsequent to corresponding signal processing, a temperature-independent elongation signal can be obtained from the interferometers comprised of the fibres 31, 32.

Figure 3B:
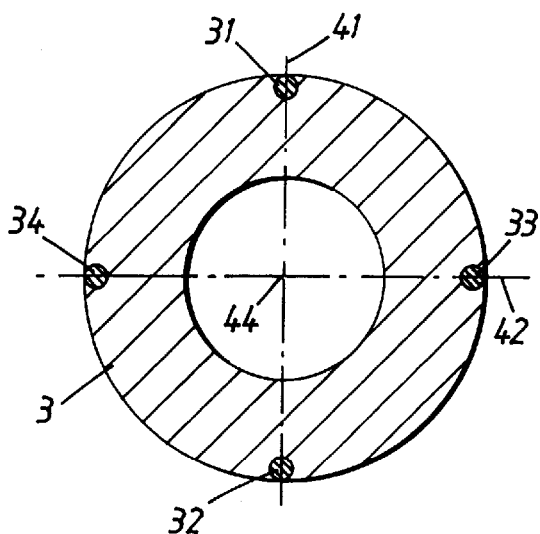

The configuration illustrated in FIG. 3b can be considered to imply that the fibre sections 32 and 34 have been moved in parallel in their respective axial planes 41, 42 to the region of the outer surface of the probe body 3. All of the active fibre sections 31–34 will thereby be located at the greatest possible distance from the axis 44, thereby also enabling the invention to be applied successfully to narrow lathe space.

Figure 3C:
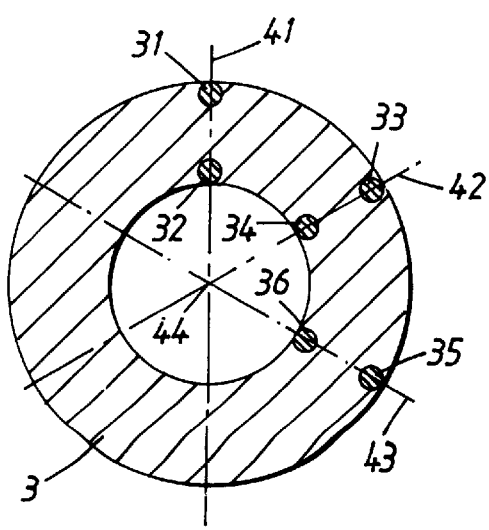
Figure 3D:
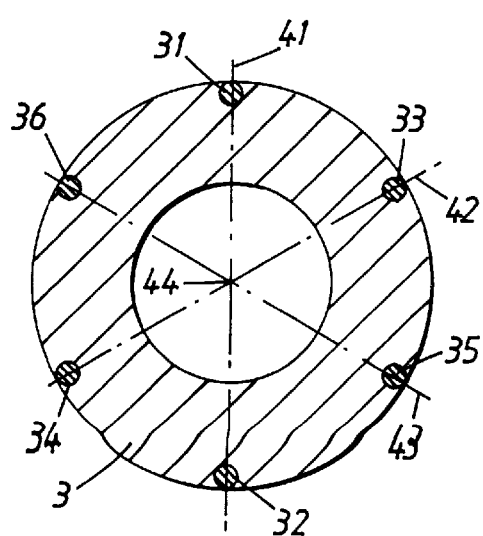

In the configuration shown in FIG. 3c, a further pair of fibre sections 35, 36 are disposed in an axial plane 43 to the axis 44, said fibres 35, 36 being parallel with one another and extending along generatrices of the body 3. In the FIG. 3c illustration, three fibre-section pairs 31, 32; 33, 34; 35, 36 are disposed in equally spaced planes. The additional information obtained by the sensors 35, 36 in the "third" axial plane can be used to compensate for any errors that occur due to shear stresses, such stresses occurring when the sensor body is subjected to pronounced curvature, i.e. is given a relatively small radius of curvature.

There have been described in the aforegoing embodiments with which elongation-sensing optical fibre sections lie in at least two angularly separated axial planes through the neutral bending line of the lathe bar, so that the bending/curvature of the bar can be measured in three dimensions. The embodiments also include an additional fibre section/Fizeau interferometer adapted to afford temperature compensation of the measuring signal.

It will be understood, however, that the lathe bar 3 need not be rotationally symmetrical. Bending of the probe body 3 can be calculated with the aid of known models for the bending of beam-like objects, by giving the probe body 3 a well-defined shape and by giving the fibre sections 31, 34 a well-defined position. However, this does not exclude the possibility of obtaining the ratio between received signals and curvature with the aid of a calibration procedure instead. In certain cases, a calibration procedure may be a necessary supplement to model calculations.

FIGS. 5a–c illustrate light intensity as a function of the wavelength of incident, reflected and transmitted light in a grid. The grid 8 is a periodic refractive index variation which has been written into the fibre core 23 with the aid of interfering UV light. When light from a broadband light source, i.e. light having a broad spectrum (FIG. 5a), is incident on the grid 8, only that wavelength which is twice as long as the periodicity of the grid will be reflected back (FIG. 5b). If the grid 8 is subjected to elongation, the reflected wavelength will increase, wherewith the wavelength change 39 of reflected light will constitute a measurement of the elongation. Such wavelength change can be measured by means of spectroscopic detection.

FIG. 5c illustrates light transmitted through the grid 8.

Although the measuring process of the illustrated embodiment is based on reflected light, it will be obvious that the measuring process may equally as well be carried out on the basis of transmitted light. Furthermore, it is, of course, possible to couple the interferometers in series when the reflection means are constructed so that they and their measurement signals can be identified, in accordance with known techniques.

The attachment end of the lathe bar 3 is shown at 50 in FIG. 1. The free end of the bar 3 carries a cutting head 58 provided with a cutting bit 59. One of the optical fibres, in the illustrated case the fibre 33, extends to the proximity of the cutting head 58 and is there provided with a grid 8c, said grid being positioned for sensing temperature in a well-known manner, wherein the temperature affects the grid and therewith the grid line spacing, therewith enabling the temperature to be read or recorded in a well-known manner, primarily the course followed by increasing temperature adjacent the cutting head 58, this temperature course indicating a malfunction, for instance indicating imminent damage to the cutting bit 59. This enables the machining operation to be interrupted and the malfunction rectified before serious damage has occurred.

Figure 6:
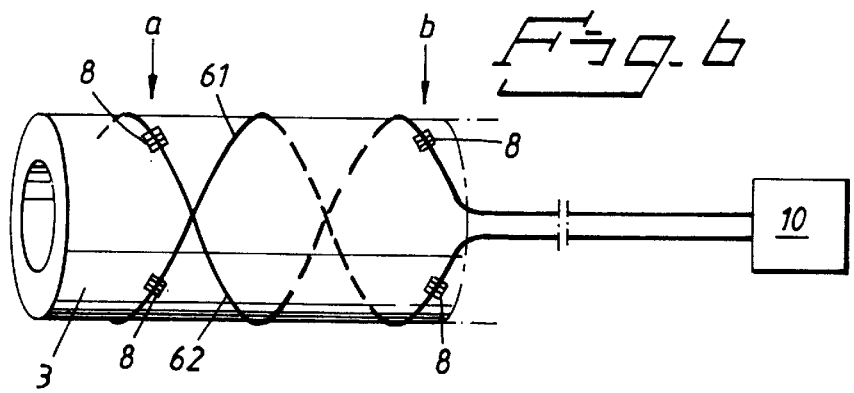
FIG. 6 illustrates the lathe bar provided with helical optical fibres.

FIG. 6 illustrates, in principle, the lathe bar 3 of FIG. 1 which has been supplemented with helical optical fibre sections 61, 62 with grids 8 in like positions a, b. The fibres 61, 62 are at a constant distance from the neutral rotation line of the lathe bar 3, and hence a change in the distance between the grids 8 in a fibre will constitute a measurement of twisting magnitudes. Information relating to twisting of the lathe bar 3 can be evaluated with the aid of a unit 10 analogously with the above description with reference to FIGS. 1 and 2.

Figure 7:
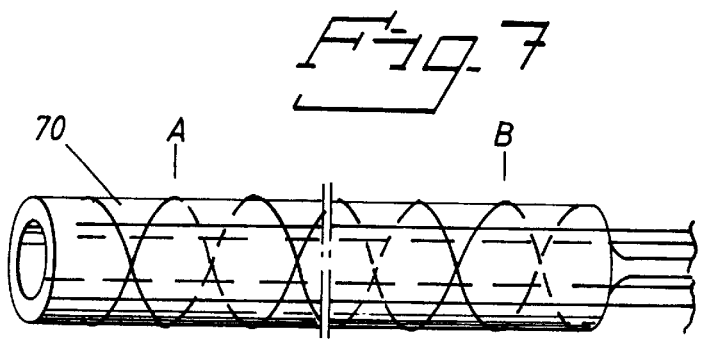
FIG. 7 shows the optical fibres mounted on a separate sleeve.
Figure 8:
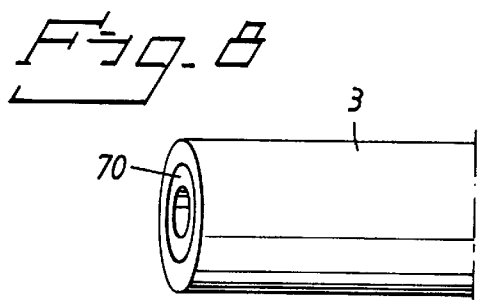
FIG. 8 shows the sleeve of FIG. 7 mounted in a coolant bore in the lathe bar.

In the case of the FIG. 7 embodiment, the fibres 31–34, 61, 62 are mounted on a sleeve 70 which, in turn, can preferably be detachably mounted on the actual tool holder shaft/lathe bar 3. In the case of the lathe bar 3, the sleeve 70 can either be placed around the cylindrical outer surface of the lathe bar 3 or, as shown in FIG. 8, in the cylindrical coaxial fluid passageway of the lathe bar 3. This enables the sleeve passageway to form a fluid conduit.

The sleeve 70 can be crimped in place, so as to lie in stable abutment with the lathe bar surface concerned. Alternatively, the sleeve 70 can be bonded to the lathe bar surface with the aid of an adhesive or a clamping means.

Figure 9:
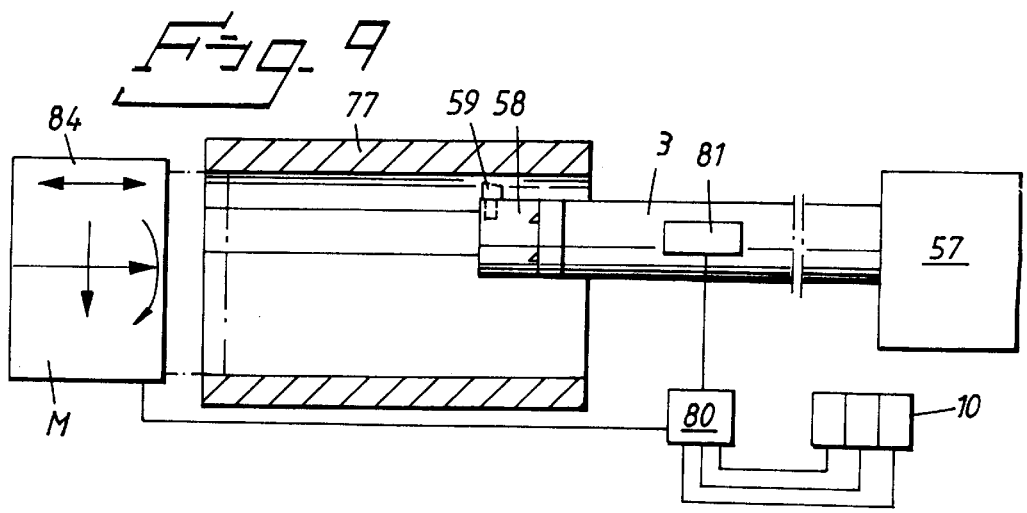
FIG. 9 illustrates schematically a machine tool that includes an inventive lathe bar.

In the FIG. 9 illustration, the lathe bar 3 has an adjustable vibration damping means 81 of known kind (NO-C-172 677) built therein. The lathe bar 3 is stably carried by an attachment 57. The units 10 act on a signal processing means 80, which may be adapted to actuate the setting means of the damping device 81.

FIG. 9 illustrates the machining of the inner surface of a generally tubular workpiece 77. The workpiece 77 is carried by carrier means 84 which causes the workpiece 77 to move relative to the cutting bit 59. The drive means 84 may thus rotate the workpiece 77, cause the workpiece 77 to move linearly both in the longitudinal and the transverse direction of the ? 3, and may also position the rotational axis obliquely in relation to the axis of the lathe bar 3. In all events, the evaluation unit 80 is adapted to control the drive means 84 to change the machining conditions in accordance with predetermined parameter variations, to limit detected vibrations and/or impermissible static deformations of the lathe bar 3.

We claim:

1. An arrangement for detecting elastic deformation of a shaft carried by a machine tool having a cutting bit, comprising an optical fibre section mounted in or on the shaft at a distance from a neutral bending axis of the shaft in the longitudinal direction of said shaft; wherein the optical fibre section, which follows the elastic deformation of the shaft, extends parallel with and at a constant distance from the neutral bending axis of said shaft so that elongation of the optical fibre section forms a measurement of bending of the shaft in an axial plane that includes the optical fibre section; wherein the optical fibre section has at least two longitudinally spaced partial reflection means; determining means connected to the optical fibre section for determining a change in distance between the partial reflection means in the optical fibre section, said change in distance providing a measurement of shaft curvature; and means for compensating for the influence of temperature on the change in distance between said partial reflection means, wherein deformation of the shaft is detected, or sensed, as a function of time; and in that at least one of a machine tool operating parameter is controlled by the sensed vibration so as to reduce said vibration to a level beneath a selected limit value.

2. The arrangement according to claim 1, further comprises computing means for determining the deviation of the cutting bit from a nominal position as a result of the detected shaft deformation, wherein said computing means are adapted to control the machine tool to compensate for said deviation.

3. The arrangement according to claim 1, further comprising means for sensing changes in shaft length.

4. The arrangement according to claim 1, wherein the shaft is a lathe bar.

5. The arrangement according to claim 1, wherein the optical fibre section is mounted on a sleeve which is detachably mountable on the shaft for following deformation of said shaft.

6. The arrangement according to claim 5, wherein the shaft has a central bore for conducting fluid coolant; and the sleeve is mounted on a wall of the shaft bore, wherein the interior of the sleeve functions to conduct said fluid.

7. An arrangement for detecting elastic deformation of a shaft carried by a machine tool having a cutting bit, comprising an optical fibre section mounted in or on the shaft at a distance from a neutral bending axis of the shaft in the longitudinal direction of said shaft; wherein the optical fibre section, which follows the elastic deformation of the shaft, extends parallel with and at a constant distance from the neutral bending axis of said shaft so that elongation of the optical fibre section forms a measurement of bending of the shaft in an axial plane that includes the optical fibre section; wherein the optical fibre section has at least two longitudinally spaced partial reflection means; determining means connected to the optical fibre section for determining a chance in distance between the partial reflection means in the optical fibre section, said change in distance providing a measurement of shaft curvature; and means for compensating for the influence of temperature on the change in distance between said partial reflection means, wherein the optical fibre section extends to a cutting tool holder on the shaft and is provided with a grid in the vicinity of the cutting bit, wherein the grid is adapted to be influenced by a temperature of or prevailing in the vicinity of the cutting bit, so as to enable the bit temperature to be followed via the optical fibre section and the grid optically.

8. The arrangement according to claim 7, further comprising computing means for determining the deviation of the cutting bit from a nominal position as a result of the detected shaft deformation, wherein said computing means are adapted to control the machine tool to compensate for said deviation.

9. The arrangement according to claim 7, further comprising means for sensing changes in shaft length.

10. An arrangement for detecting elastic deformation of a shaft carried by a machine tool having a cutting bit, comprising an optical fibre section having partial reflection means which extends helically around the shaft at a constant distance from a neutral rotational axis of the shaft, wherein the optical fibre section follows the elastic deformation of the shaft, and the partial reflection means senses twisting of the shaft; determining means connected to the optical fibre section for determining a change in distance between the partial reflection means in the optical fibre section and evaluates shaft twisting.

11. The arrangement according to claim 10, further comprising means for sensing changes in shaft length.

12. The arrangement according to claim 10, further comprising computing means for determining the deviation of the cutting bit from a nominal position as a result of the detected shaft deformation, wherein said computing means are adapted to control the machine tool to compensate for said deviation.

13. An arrangement for detecting elastic deformation of a shaft carried by a machine tool having a cutting bit, comprising an optical fibre section mounted in or on the shaft at a distance from a neutral bending axis of the shaft in the longitudinal direction of said shaft; wherein the optical fibre section, which follows the elastic deformation of the shaft, extends parallel with and at a constant distance from the neutral bending axis of said shaft so that elongation of the optical fibre section forms a measurement of bending of the shaft in an axial plane that includes the optical fibre section; wherein the optical fibre section has at least two longitudinally spaced partial reflection means; determining means connected to the optical fibre section for determining a change in distance between the partial reflection means in the optical fibre section, said chance in distance providing a measurement of shaft curvature; and means for compensating for the influence of temperature on the change in distance between said partial reflection means, wherein the shaft includes vibration damping means having setting means; and control means which processes information relating to elastic deformation of the shaft and assigns setting values to the setting means or to control said setting means.

14. The arrangement according to claim 13, further comprising computing means for determining the deviation of the cutting bit from a nominal position as a result of the detected shaft deformation, wherein said computing means are adapted to control the machine tool to compensate for said deviation.

15. The arrangement according to claim 13, further comprising means for sensing changes in shaft length.

16. An arrangement for detecting elastic deformation of a shaft carried by a machine tool having a cutting bit, comprising an optical fibre section mounted in or on the shaft at a distance from a neutral bending axis of the shaft in the longitudinal direction of said shaft; wherein the optical fibre section, which follows the elastic deformation of the shaft, extends parallel with and at a constant distance from the neutral bending axis of said shaft so that elongation of the optical fibre section forms a measurement of bending of the shaft in an axial plane that includes the optical fibre section; wherein the optical fibre section has at least two longitudinally spaced partial reflection means; determining means connected to the optical fibre section for determining a change in distance between the partial reflection means in the optical fibre section, said chance in distance providing a measurement of shaft curvature; and means for compensating for the influence of temperature on the chance in distance between said partial reflection means, control means which processes information relating to elastic deformation of the shaft and assigns setting values for working parameters of the machine tool associated with said shaft, or to control working parameters of the machine tool associated with said shaft.

17. The arrangement according to claim 16, further comprising means for sensing changes in shaft length.

18. The arrangement according to claim 16, further comprising computing means for determining the deviation of the cutting bit from a nominal position as a result of the detected shaft deformation, wherein said computing means are adapted to control the machine tool to compensate for said deviation.

19. An arrangement for detecting elastic deformation of a shaft carried by a machine tool having a cutting bit, comprising an optical fibre section mounted in or on the shaft at a distance from a neutral bending axis of the shaft in the longitudinal direction of said shaft; wherein the optical fibre section, which follows the elastic deformation of the shaft, extends parallel with and at a constant distance from the neutral bending axis of said shaft so that elongation of the optical fibre section forms a measurement of bending of the shaft in an axial plane that includes the optical fibre section; wherein the optical fibre section has at least two longitudinally spaced partial reflection means; determining means connected to the optical fibre section for determining a chance in distance between the partial reflection means in the optical fibre section, said change in distance providing a measurement of shaft curvature; and means for compensating for the influence of temperature on the change in distance between said partial reflection means, wherein the partial reflection means form parts of a grid structure, wherein change in the electromagnetic signature of the grid is sensed and determined by determining means for forming a measurement of shaft curvature at the grid.

20. The arrangement according to claim 19, further comprising means for sensing changes in shaft length.

21. The arrangement according to claim 19, further comprising computing means for determining the deviation of the cutting bit from a nominal position as a result of the detected shaft deformation, wherein said computing means are adapted to control the machine tool to compensate for said deviation.

22. An arrangement for detecting elastic deformation of a shaft carried by a machine tool having a cutting bit, comprising an optical fibre section mounted in or on the shaft at a distance from a neutral bending axis of the shaft in the longitudinal direction of said shaft; wherein the optical fibre section, which follows the elastic deformation of the shaft, extends parallel with and at a constant distance from the neutral bending axis of said shaft so that elongation of the optical fibre section forms a measurement of bending of the shaft in an axial plane that includes the optical fibre section; wherein the optical fibre section has at least two longitudinally spaced partial reflection means; determining means connected to the optical fibre section for determining a change in distance between the partial reflection means in the optical fibre section, said chance in distance providing a measurement of shaft curvature; and means for compensating for the influence of temperature on the change in distance between said partial reflection means, wherein the partial reflection means are comprised of grids or mirror arrangements that are mutually separated along the optical fibre section, wherein a change in distance therebetween forms a measurement of shaft curvature therebetween.

23. The arrangement according to claim 22, further comprising means for sensing changes in shaft length.

24. The arrangement according to claim 22, further comprising computing means for determining the deviation of the cutting bit from a nominal position as a result of the detected shaft deformation, wherein said computing means are adapted to control the machine tool to compensate for said deviation.

* * * * *